Oct. 22, 1929.   A. M. JOHNSON   1,732,558
AUTOMATIC FACING TOOL FOR DRILLING MACHINES AND THE LIKE
Original Filed March 8, 1923
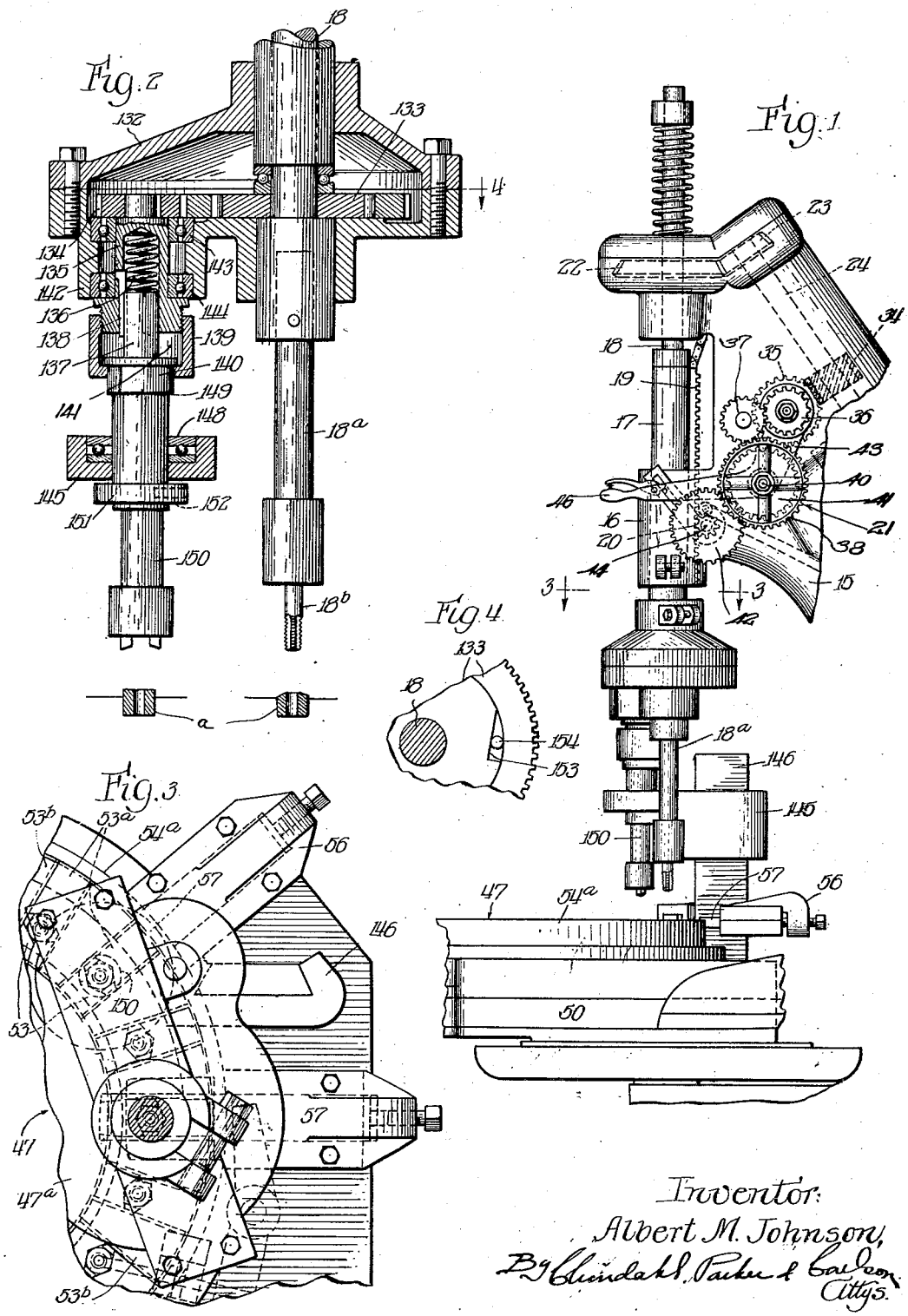
Inventor:
Albert M. Johnson, Patented Oct. 22, 1929

1,732,558

UNITED STATES PATENT OFFICE

ALBERT M. JOHNSON, OF ROCKFORD, ILLINOIS, ASSIGNOR TO BARNES DRILL CO., OF ROCKFORD, ILLINOIS, A CORPORATION OF ILLINOIS

AUTOMATIC FACING TOOL FOR DRILLING MACHINES AND THE LIKE

Original application filed March 8, 1923, Serial No. 623,631. Divided and this application filed March 13, 1924. Serial No. 698,838.

The invention pertains to a means for facing nuts and similar articles of manufacture as an incident to the drilling, tapping or boring operation of a machine tool or independently of such operation.

The object of my invention is to provide a facing means for drilling, boring or tapping machines, which is operable automatically to produce a smooth finish upon one or more surfaces of the work.

A specific object of the invention is to provide a facing means which is adapted to operate upon one piece of work while the machine performs another operation upon a second piece of work.

In the accompanying drawings,

Figure 1 is a fragmentary side elevational view of a tapping machine which is equipped with the facing means of my invention.

Fig. 2 is a fragmentary vertical sectional view through the facing tool and showing its association with the main spindle on the machine.

Fig. 3 is a fragmentary horizontal sectional view illustrating the facing means in plan, the section being taken through the spindle in the plane of line 3—3 of Fig. 1.

Fig. 4 is a fragmentary sectional view taken approximately in the plane of line 4 of Fig. 2.

The machine selected for purposes of illustration is a tapping machine of the type shown and described in my copending application Serial No. 623,631, filed March 8, 1923, of which this application is a division. Said machine comprises a main support or column 15, the upper end of which is extended forwardly to form a head or bearing 16 in which is mounted for vertical sliding movement a sleeve 17. The latter in turn has a spindle 18 journaled therein which carries at its lower end a tool shank 18ª equipped with a tap 18ᵇ. The sleeve has fixed thereto a rack 19 with which a pinion 20 of a feed mechanism 21 is adapted to mesh. The spindle 18 has splined upon its upper end a bevel gear 22 meshing with a pinion 23 upon the upper end of an inclined shaft 24 which forms a part of a change speed transmission communicating with a suitable source of motive power. The feed mechanism 21 (Fig. 1) is arranged to be driven from the shaft 24 of the change speed transmission through a worm 34 meshing with a worm gear 35 which is rigid with a spur gear 36. The latter is connected through a gear train 37—38 with a horizontal shaft 40 having fast thereon a spur gear 41 which meshes with a spur gear 42 rigid with a cross feed spindle 44 carrying the pinion 20. The gears 37, 38 and 41 are mounted on a bracket 43 pivoted on the axis of the gear 36 and swingable by means of a lever 46 which carries the gear 41 into and out of mesh with the gear 42.

47 indicates a circular table or turret for supporting the work which is herein shown as in the form of nut blanks $a$ to be faced and tapped. This turret is mounted for rotation with a step by step movement by suitable means (not shown) to present the blanks $a$ successively to the cutting tool or tools as the case may be. The blanks while being operated upon may be held in position by a pair of clamping jaws 53 and 53ª mounted for sliding movement in the upper face of the turret between plates 53ᵇ (Fig. 3). The inner ends of the jaws 53 normally abut the outer periphery of a ring 47ª rigid with the turret 47 and the outer ends of the jaws 53ª normally engage a stationary annular rim or flange 54ª which is suitably mounted upon the stationary table 50. A bracket 56 stationarily supported at the inner or rear side of the table carries a cam member 57 the forward end of which operatively engages with the outer ends of the jaws 53ª as the latter in their rotation pass below the cutting tool, the rim or flange 54ª being cut away for this purpose. As will be evident, two cam members 57 are provided in the present instance one opposite the main spindle 18 and another opposite an auxiliary or facing tool spindle 150 to be presently described.

The facing means which I have provided comprises a tool mounted for movement with the machine spindle but adapted to dwell in its travel prior to the disengagement of the feed mechanism. Herein, I have shown a tool for facing the upper surfaces of nut blanks $a$ prior to the tapping operation, and the tool is mounted on an auxiliary spindle 137 which is connected with but capable of yielding relative to the main spindle 18 when stopped or dwelled by engagement with a stationary part on the base. Other means for rendering the feed mechanism ineffective and permit the facing tool to stop or dwell in its travel, will doubtless occur to those skilled in the art, so that I do not wish to be understood as intending to limit myself to the particular construction and arrangement herein employed except as may be necessitated by the state of the prior art.

Referring now to Figs. 1 and 2, the sleeve 17, in which the spindle 18 is journaled, carries near its lower end a housing 132 in which is enclosed a gear 133 fast upon the spindle 18 and meshing with a pinion 134 on the upper end of a hollow member 135. In said member is inserted a coiled compression spring 136 acting upon the upper end of an auxiliary spindle 137 splined as at 138 to said member. A ring 139, internally flanged at its lower end, is screw-threaded upon the lower end of said member so as to hold the parts together, said auxiliary spindle having a collar 140 fast thereon with which the inturned flange of the ring engages. A space 141 is provided between the lower end of the tubular member 135 and the flange of collar 140, to permit relative movement between these parts under the compression of the spring 136.

The housing 132 has a depending tubular projection 142 having a pair of radial bearings 143 and 144 therein which encircle the member 135 between it and said tubular projection. The lower end of the auxiliary spindle passes through a stationary bracket 145 adjustably mounted upon a post 146 (Fig. 1) rising from the stationary table 50. In the upper face of this bracket 145 is formed a recess for receiving a radial thrust bearing 148 with which a shoulder 149 formed upon the auxiliary spindle is adapted to bear to limit the downward movement of the latter. A suitable facing tool 150 is carried by the auxiliary spindle, the latter having a socket in its lower end for this purpose and also having a clamping collar 151 on the spindle provided with a radial screw 152 which is adapted to enter said socket and secure the tool shank therein.

The parts are so arranged that in the downward movement of the main spindle 18, the auxiliary spindle also moves downwardly through its connection with the sleeve 17, and the facing tool carried thereby engages with the upper face of one blank $a$ while the tap or other screw-thread cutting tool engages with a preceding blank, the two tools being properly spaced apart for this purpose and two clamping means for the work being provided opposite each of the tools as shown clearly in Fig. 3. As the thread cutting tool enters the blank, the facing tool engages with the upper surface of an adjacent blank, and before the thread cutting operation is completed, the shoulder 149 engages with the radial thrust bearing 148 in the arm 145, thus stopping the downward movement of the auxiliary spindle 137, while spindle 18 and tap 18$^b$ continue downward to finish the tapping operation. That is, the housing 132 may continue to descend and with it the tubular member 135 by reason of the yielding of the spring 136. The result, it will be apparent, is that after having been fed to effect the removal of metal from the upper face to the desired depth, the feeding movement is cut off while the facing tool continues to operate whereby to produce a smooth, finished surface for the blank. If the feeding of the facing tool were not thus interrupted, it will be apparent that when it ceased its operation upon the blank a rough surface due to the abrupt stop would necessarily result.

In order to avoid reversely rotating the auxiliary spindle when the main spindle is reversed, I preferably make the gear 133 in two sections between which is a one-way clutch consisting of a plurality of recesses 153 having inclined outer walls (Fig. 4), and rollers 154 entered in the recess.

I claim as my invention:

1. In a machine tool, the combination of a reciprocatory tool-carrying spindle, means for rotating said spindle, feed mechanism for moving the spindle longitudinally independently of its rotary movement, an auxiliary spindle having a gearing connection with the first mentioned or main spindle and carrying a second cutting tool, means including a spring through which feed motion is transmitted to the auxiliary spindle, and means for stopping the feeding movement of the second tool prior to the end of the feeding movement of the main spindle.

2. In a machine tool, the combination of a main spindle, feeding means for said spindle including a sleeve surrounding the spindle, a housing fast upon said sleeve, an auxiliary spindle mounted in said housing and arranged to be driven from the main spindle, means for limiting the downward movement of the auxiliary spindle, and means for permitting the continued feeding movement of the main spindle after the movement of the auxiliary spindle has been stopped, the last mentioned means including a spring through which feed motion is transmitted to the auxiliary spindle.

3. In a machine tool, the combination of a main spindle, feeding means for said spindle including a supporting sleeve, a housing fast upon said sleeve, an auxiliary spindle mounted in said housing, and a driving connection between said auxiliary spindle and said main spindle operable to drive said auxiliary spindle in one direction only.

4. In a machine tool, the combination of a main spindle, means for feeding said spindle to the work including a sleeve, a housing carried by said sleeve, an auxiliary spindle mounted in said housing, gearing enclosed by the housing for driving the auxiliary spindle, spring means interposed between the auxiliary spindle and its driving means for permitting relative movement between the auxiliary spindle and the main spindle, and means for limiting the feeding movement of the auxiliary spindle.

5. An automatic tapping machine comprising a main tap carrying spindle, means for feeding said spindle with its tap to the work, means for supporting the work beneath said main spindle including a table having means for receiving and holding separate pieces of work arranged in equi-distantly spaced relation, and an auxiliary spindle having a facing tool and adapted to engage with one piece of work while the tap is engaging with another piece of work, said auxiliary spindle having an axially yieldable connection with the main spindle and adapted to be driven and fed thereby, and means for interrupting the feeding movements of the auxiliary spindle prior to the cessation of the feeding movement of the main spindle.

6. In a machine tool, the combination of a reciprocatory spindle, a work supporting table, a power actuated feed mechanism, feed motion transmitting means including a spring interposed between said feed mechanism and said spindle, and a stationary head at one side of the table adapted to limit the feeding movement of the spindle, said spring being operable to permit the feed mechanism to continue to operate after the movement of the spindle has been interrupted.

7. In a machine tool, in combination, a rotary telescoping tool spindle comprising two telescoping sections, spring means compelling separation of said sections, limiting means for the separating action, means to feed the tool of said spindle against a piece of work, said spring being sufficiently strong to prevent closing in of said spindle parts by the pressure of the feed, and a positive stop means operative upon the tool carrying part of said spindle to prevent advance of the tool whereby to compress the spring of said spindle.

8. In a machine tool, in combination, a tool carrying spindle, a housing therefor movable axially of the spindle, means to move said housing, driving means for the spindle, said spindle being comprised of telescoping parts, one of said parts being carried by the housing, the other part carrying a tool, spring means compelling extension of said spindle parts, limiting means to prevent extension of said spindle, a fixed abutment, and a part on said tool-carrying spindle part arranged to engage said abutment, whereby to cause the tool in said spindle to dwell during feeding of the housing.

9. In a machine tool, two parallel tool carrying spindles, means to feed both spindles axially simultaneously and equally, one of said spindles being resiliently mounted in an axial direction, a positive stop means positioned in advance of and adjacent to the path of feed of said spindle, and means associated with said spindle to engage said stop means to prevent feeding thereof with the other spindle.

10. In a machine tool, two parallel tool carrying spindles arranged for integral axial motion, means for feeding both spindles simultaneously, one of said spindles being mounted resiliently in an axial direction, cooperative stop means carried in part by said spindle and arranged to prevent the integral axial feeding and to cause said spindle to dwell in its feed against the resilient mounting.

In testimony whereof, I have hereunto affixed my signature.

ALBERT M. JOHNSON.